Figure 1:
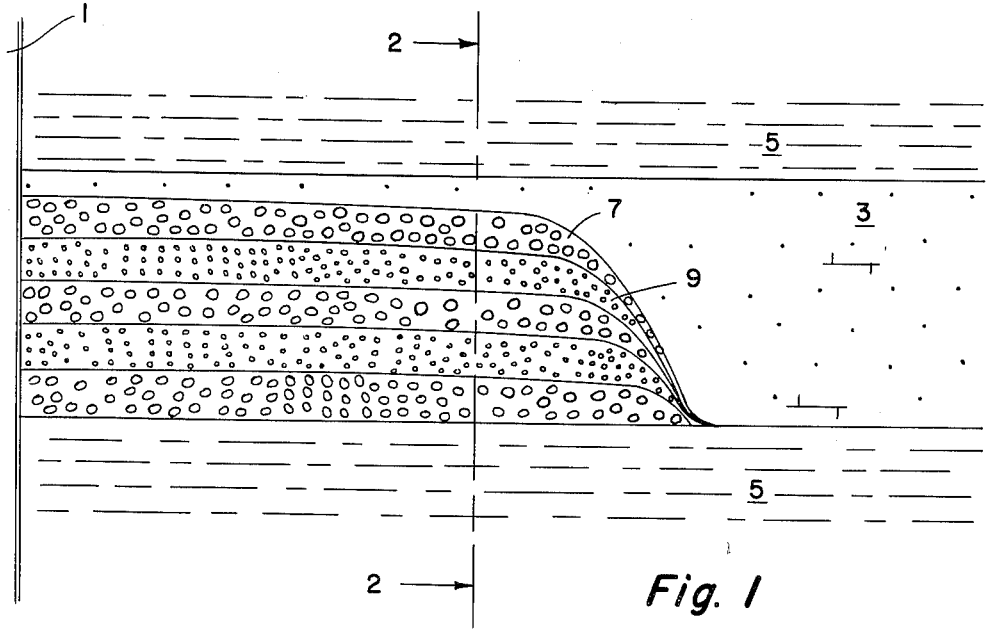

Feb. 15, 1966         L. R. KERN ETAL         3,235,007
           MULTILAYER PROPPING OF FRACTURES
                Filed Sept. 5, 1961

ATTEST:
Charles F. Steininger

INVENTORS:
LOYD R. KERN
WILLIAM J. McGUIRE, JR.
WILLIAM F. KIESCHNICK, JR.
BY Herbert E. Birch
ATTORNEY

United States Patent Office 3,235,007
Patented Feb. 15, 1966

3,235,007
MULTILAYER PROPPING OF FRACTURES
Loyd R. Kern, Irving, and William J. McGuire, Jr., Dallas, Tex., and William F. Kieschnick, Jr., Lafayette, La., assignors to The Atlantic Refining Company, Philadelphia, Pa., a corporation of Pennsylvania
Filed Sept. 5, 1961, Ser. No. 136,054
17 Claims. (Cl. 166—42)

The present application is a continuation-in-part of application Serial No. 51,149, filed August 22, 1960, now U.S. Patent No. 3,155,159. The present application is also related to U.S. Patent No. 3,127,937 and U.S. Patent No. 2,950,247.

The present invention relates to an improved method for increasing the permeability of subsurface earth formations. In a more particular aspect, the present invention relates to an improved method for increasing the permeability of subsurface earth formations by creating highly permeable fractures in such formations.

It is now well known in the art of petroleum production techniques that subsurface formations containing hydrocarbons can be made more permeable and thus more readily produced if an existing fracture in the formation is propped open with solid, particle-form propping agents or a fracture is created in such formation and is thereafter propped open with a propping agent. It is also known that the production rate of the water-producing formations can be similarly improved and that increased injectivity of fluids into a formation can be obtained by these techniques.

Generally, such fracturing and propping is carried out by disposing a fluid, such as water, crude oil, kerosene, gelled water, gelled crude oil, gelled kerosene, or emulsions, opposite the formation of interest and applying sufficient pressure to such fluid to crack the formation and form a fracture therein. Following such fracturing of the formation, a fluid carrying a solid, particle-form propping agent is then suspended in a suitable carrier fluid and the suspension is injected into the fracture. Leakoff or subsequent removal of the carrier fluid will then deposit the propping agent between the walls of the fracture and the fracture will thus be held open. Since even very small grained propping agents will usually result in a higher permeability through the propped fracture than through the formation itself, the ease with which fluids can be produced from or injected into such a fracture formation is therefore improved.

It has been the general practice in the fracturing art to utilize small grained sand as a propping agent with the most widely used material being smaller than 20 mesh or about 0.03 inch in diameter. There is, however, a definite limit to the increase in permeability which can be obtained by the use of such small grained sand since such materials pack together very tightly or, when moderately high pressures are encountered, such materials will crush into small fragments and result in comparatively low permeabilities.

Although subsurface formation fractures may be oriented in either a horizontal or vertical plane, it is believed that a substantial number of fractures created in formations less than about 3,000 feet below the surface of the earth will be oriented in a horizontal plane while the remainder at shallow depths and those created in formations located at greater depths will generally be oriented in a vertical direction. However, even in those cases where the fracture would normally be horizontally oriented, techniques are now known by which a fracture can be oriented in a vertical direction as, for example, by jet notching of the formation in the desired direction and other comparable techniques. It is the improvement of the permeability of such bertically oriented fractures with which the present invention is concerned.

It is, therefore, an object of the present invention to provide an improved method for increasing the permeability of vertically oriented fractures.

Another object of the present invention is to provide an improved method for increasing the permeability to fluids of vertically oriented fractures and the ease with which fluids may be produced therefrom.

Still another object of the present invention is to provide an improved method for increasing the permeability to fluids of vertically oriented fractures and the ease with which fluids may be injected into such fractures.

A still further object of the present invention is to provide a method for increasing the permeability to oil of vertically oriented fractures passing through an oil-producing zone in a subsurface formation.

Another and further object of the present invention is to provide an improved method for selectively plugging a water-bearing zone of a subsurface formation while substantially increasing the permeability of an oil-bearing zone in such formation.

Another object of the present invention is to provide an improved method for plugging a gas-bearing zone of a subsurface formation while increasing the permeability of an oil-bearing zone of such formation.

Figure 2:
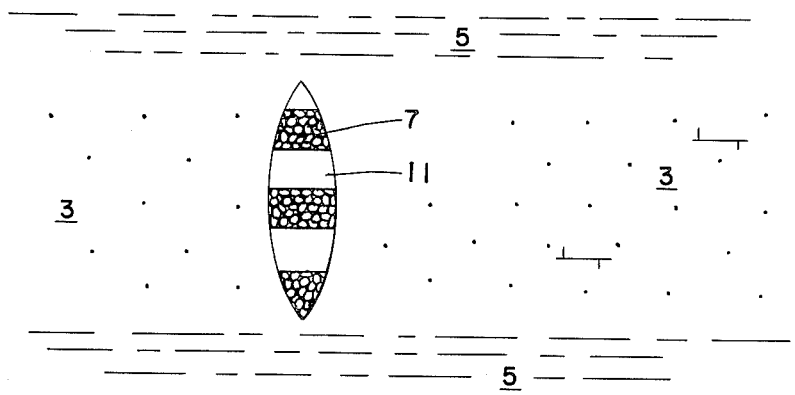

These and other objects and advantages of the present invention will become apparent from the following detailed description when read in conjunction with the drawings, wherein:

FIGURE 1 is a vertical section of a subsurface formation taken through a fracture in such formation and indicating the selective placement of solid particles in accordance with the present invention, and FIGURE 2 is a vertical cross section of the fracture of FIGURE 1 showing the condition of the fracture upon completion of the method of the present invention.

In copending application Serial No. 51,149, now U.S. Patent 3,155,159, it is proposed that a layer of a selected solid material, either a propping or plugging agent, may be placed in the bottom of a vertical fracture by injecting the solid particles into a fracture in a carrier fluid in which such particles will have a falling rate greater than about 0.1 foot per minute. By employing this technique, a layer of the selected material can be placed in the bottom of a fracture to shut off a water zone underlying an oil-producing zone or to deposit a conventional propping agent to partially fill the fracture. The subject application further teaches the the space above this lower layer of material may then be propped open with a conventional propping agent, where the first material was a water shut-off agent, or large propping agents in a sparse population, where the first material was a conventional propping agent.

Copending application, Serial No. 51,078, now U.S. Patent No. 3,127,937, teaches that a first particle-form material may be placed in the top of a vertical fracture, either to prop the fracture open or shut off a gas-producing zone above an oil zone, by selecting a material having a specific gravity equal to or less than the specific gravity of the fluid used to carry the solid into the fracture. As in the previous application, this first step of floating a layer of material to the top of the fracture is followed by the injection of a suspension of conventional propping agents or, preferably, large propping agents in a sparse population.

The present invention utilizes the above-described techniques for the selective placement of solids in a fracture to produce a highly permeable vertically oriented fracture. Briefly, in accordance with the present invention, thin alternate layers comprised of at least two layers of an insoluble, solid, particle-form material and of at least two layers of a soluble, solid, particle-form material are deposited in a vertically oriented fracture. Following the deposition of a multiplicity of such alternate layers, the soluble material is removed from the fracture by the solvent action of the fluids being produced or by the injection of extraneous fluids which will act as a solvent for the soluble material. Accordingly, the vertical fracture will then be propped open by a plurality of horizontally disposed bridges of insoluble material across the fracture with alternate void spaces therebetween. It has also been found in accordance with the present invention, that the alternate layers of soluble and insoluble particles may be deposited in the fracture either by flotation or gravity settling or both as previously described.

Referring now to the drawings, which are for illustrative purposes only and are not drawn to scale, FIGURE 1 shows a vertical section of a subsurface earth formation penetrated by well bore 1 and having a permeable formation 3 bounded by impermeable formations 5 such as shale layers. In accordance with FIGURE 1, alternate layers of particle-form solids are placed in the fracture by gravity settling from a carrier fluid during the injection of such fluid and particles into the fracture. The layers 7 indicate an insoluble solid material employed to prop the fracture open while layers 9 are layers of a soluble material which will be later removed from the fracture. In the drawings, layers 7 and 9 and the particle-form solids therein are not drawn to scale. As indicated earlier with reference to FIGURE 1, thin alternate layers of the soluble and insoluble particles are deposited in the fracture in the first step of the present method by gavity settling. It should be recognized, however, that these layers may also be deposited by floating successive layers of the materials into the fracture. In the latter case, building of the layers would begin from the top of the fracture rather than from the bottom as shown in FIGURE 1.

FIGURE 2 is a cross section taken through the fracture of FIGURE 1 showing the condition of this fracture after the soluble particles have been removed by a suitable solvent. As depicted in FIGURE 2, the insoluble particles 7 form horizontally disposed bridges across the fracture with alternate void sections 11 formed between the layers of insoluble particles.

As previously indicated, in accordance with one aspect of the present invention, alternate layers of soluble and insoluble particles are deposited in a vertically oriented fracture by successively floating these materials into the fracture. In this case, advantage is taken of the comparative specific gravities or densities of the particle-form solids and the fluids employed to carry these solids into the fracture. Suitable carrier fluids will have a specific gravity of less than 2.0 and will generally be between about 0.8 and 1.6. A specific example of such a carrier would be an aqueous solution of sodium chloride. For example, a 16 percent solution has a specific gravity of 1.12 and a 26 percent solution a specific gravity of 1.19. Other materials, such as sulfuric acid, having slightly higher densities, may also be employed in the practice of the present invention. The solid particle-form material is then selected to have a specific gravity equal to or less than that of the carrier fluid to thereby float the solids into the fracture and build up a plurality of layers of the solids from the top of the fracture down to the bottom of the fracture. Accordingly, the specific gravity of the solid materials should be below about 2.0. In operation, the first solid material, in an amount sufficient to form a layer of the desired thickness, is mixed in the carrier fluid and injected into the fracture. Following this, the second material in a preselected volume is mixed in the carrier, or, if desired, another carrier, and injected into the fracture. Likewise successive volumes of the first and second solid materials are then injected into the formation.

In accordance with the second variation of the present invention, alternate layers of soluble and insoluble materials are deposited in a vertical fracture by gravity settling of the particle-form solid from a suitable carrier fluid. The carrier fluid in this case may be water, oil, any of the well known gelled or viscified aqueous or hydrocarbon materials, or water-oil emulsions. In this instance, the solid, particle-form material should settle through the carrier fluid at a rate in excess of 0.1 foot per minute. Because of this high settling rate, the solid particles will settle from the carrier fluid as the carrier fluid passes into the fracture and form a layer on the bottom of the fracture. In actual operation, the first particle-form solid is mixed in a suitable carrier fluid and injected into the formation in an amount sufficient to form a layer of the thickness desired. Thereafter, the second particle-form solid is mixed in the same or another carrier fluid in an amount sufficient to form the desired layer of this material on top of the first layer. These steps are repeated a number of times to thereby build up alternate layers of soluble and insoluble material in the fracture.

After having deposited alternate layers of soluble and insoluble material in the fracture, the soluble material may be removed in one of several ways depending upon the type of soluble material employed and the purpose of the fracturing operation. First of all, by selecting an oil-soluble material, this material can be removed simply by producing oil from the formation or injecting oil or a hydrocarbon solvent into the formation. When the soluble material is to be removed by injection of an extraneous fluid into the formation, this step should be carried out at a comparatively low injection rate so that the fracture walls will not be spread apart and the insoluble material will not be dislodged. If the soluble material selected is a water-soluble material and it is placed in a water-bearing formation, the soluble material may be removed by producing water. However, in most cases, water would be injected at a slow rate to remove the soluble material and thereby make the formation more permeable for oil production or more permeable for the subsequent injection of secondary recovery fluids, such as water and gas. Finally, the soluble material selected may be a material which is soluble in acids or strong bases and, after the alternate layers have been deposited in the fracture, the soluble material is removed by the injection of acid or a strong base at a slow rate.

Suitable oil-soluble materials for use in accordance with the present invention include, for example, bituminous materials such as bitumin, its by-products and natural asphalts.

Materials which may be dissolved by a strong acid or base, a petroleum solvent or crude oil itself include hard waxes, such as beeswax, carnauba wax, shellac wax and hydrogenated waxes, and fats and hardened oils including hydrogenated oils, such as vegetable oils (soybean, cottonseed, etc.) and mineral oils (cup greases). Other materials of this class include polycyclic aromatic compounds, including naphthalene, anthracene, fluorene and chrysene.

Other acid-soluble materials which may be used include particle-form limestone, oyster shell and the like.

Suitable water-soluble materials include granulated sugar, salts of ammonium, and salts of metals of Group I of the periodic table, particularly Group IA, such as sodium chloride, sodium carbonate and sodium bicarbonate.

Particle-form materials which may be utilized as the insoluble material include various metals, ceramics and plastics, such as steel shot, aluminum, alloys of aluminum, alumina, glass beads and various insoluble plastics. Naturally occurring organic materials may also be employed, such as crushed and rounded walnut shell, peach seeds, coconut shell, pecan shell, etc., and seeds such as grape seed and the like which have not been reduced in size.

The above-mentioned insoluble particles may be utilized in either variation of the present invention since coating these materials with low density plastics, waxes and asphalts in a sufficient amount will result in particles having a density lower than that of the carrier fluid and which can, therefore, be floated into the fracture.

In addition, the bridges of insoluble material may comprise a permeable bridge or an impermeable bridge. Accordingly, conventional sized propping agents, such as sand in the 20–40 mesh range, or large-sized, manufactured, formable materials or naturally occurring materials, above about 0.03 inch in diameter, may be employed to form permeable bridges. The latter materials can also be deposited in a sparse population to further increase the permeability through the bridge material. However, in many cases, it is preferred that the bridge material form a consolidated mass which has little or no permeability to fluids. This may be accomplished by utilizing the above-specified solids with a coating of pliable materials which will squeeze together and consolidate when the walls of the fracture are permitted to close against the propping material. These coatings could, of course, be suitable plastics, waxes, asphalts or other like materials.

The method of the present invention may be utilized alone or in combination with the technique for shutting off bottom water as set forth in copending application, Serial No. 51,149, now U.S. Patent No. 3,155,159, or the technique for shutting off a gas zone as set forth in copending application 51,078, now U.S. Patent No. 3,127,937. In the latter two instances, the plugging material would be placed in the bottom of the fracture in the case of a water zone and in the top of the fracture in the case of a gas zone in order to plug these sections of the formation. Many of the previously mentioned water or methane insoluble materials, in proper size ranges, can be used for this purpose. Thereafter the method of depositing thin alternate layers of soluble and insoluble particles, as previously described, would be practiced in accordance with the present invention.

Although specific examples of materials for use in accordance with the present invention have been set forth herein, it is obvious that one skilled in the art will be familiar with various other materials having the specified properties and characteristics. Accordingly, the present invention is limited only in accordance with the following claims.

We claim:

1. A method for increasing the permeability to fluids of a subsurface earth formation having at least one vertically oriented fracture extending from the wall of the well bore into said information comprising successively injecting into said well bore and thence into said fracture alternate discrete slugs of a carrier fluid mixed with insoluble particle-form solids insoluble in a preselected fluid and of a carrier fluid mixed with soluble particle-form solids soluble in said preselected fluid, at least two of each of said slugs being so injected, said discrete slugs being injected at a pressure sufficient to hold said fracture open wide enough to permit said slugs to enter said fracture, the concentration of solids in the carrier fluid of each of said discrete slugs being in an amount sufficient to form a discrete layer of solid particles of preselected thickness when deposited in said fracture whereby a plurality of thin alternate layers of said insoluble solids and said soluble solids are deposited in said fracture, said insoluble solids and said soluble solids having a density greater than the density of the carrier fluid with which they are mixed, ceasing injection of said carrier fluid into said fracture thereby releasing the pressure holding said fracture open, and permitting said soluble solids to be dissolved with said preselected fluid whereby said fracture remains propped open by horizontally disposed bridges of said insoluble solids having void spaces between said bridges.

2. A method in accordance with claim 1 wherein at least one slug of said insoluble solids is coated with a pliable material.

3. A method in accordance with claim 1 wherein the recited steps are preceded by initially introducing into the fracture a plugging agent adapted to plug that portion of said fracture which extends into a zone of the formation which contains undesired fluids.

4. A method in accordance with claim 3 wherein the plugging agent is insoluble in methane and is introduced into that portion of the fracture which extends into an upper gas-bearing zone of the formation.

5. A method in accordance with claim 3 wherein the plugging agent is insoluble in water and is deposited in that portion of the fracture which extends into a lower water-bearing zone of the formation.

6. A method in accordance with claim 1 wherein the preselected fluid is a native fluid present in the formation and the insoluble solids are insoluble and the soluble solids are soluble in said native fluid, and said soluble solids are dissolved by producing said native fluid from said formation through the fracture.

7. A method in accordance with claim 6 wherein the soluble and insoluble solids settle through the carrier fluid at a rate in excess of 0.1 foot per minute.

8. A method in accordance with claim 6 wherein the soluble and insoluble solids have a density less than the density of the carrier fluid with which the solids are mixed.

9. A method in accordance with claim 1 wherein the soluble and insoluble solids settle through the carrier fluid at a rate in excess of 0.1 foot per minute.

10. A method in accordance with claim 9 wherein the soluble solids are dissolved by flowing said preselected fluid through said fracture at a flow rate below the rate at which the width of said fracture will permit said insoluble particles to settle.

11. A method in accordance with claim 1 wherein the soluble and insoluble solids have a density less than the density of the carrier fluid with which the solids are mixed.

12. A method in accordance with claim 11 wherein the soluble solids are dissolved by flowing said preselected fluid through said fracture at a flow rate below the rate at which the width of said fracture will permit said insoluble particles to settle.

13. A method in accordance with claim 1 wherein the soluble solids are dissolved by flowing said preselected fluid through said fracture at a flow rate below the rate at which the width of said fracture will permit said insoluble particles to settle.

14. A method in accordance with claim 13 wherein the soluble solids are dissolved by injecting said preselected fluid into said fracture.

15. A method in accordance with claim 14 wherein said preselected fluid is water.

16. A method in accordance with claim 14 wherein the preselected fluid is acid.

17. A method in accordance with claim 14 wherein the preselected fluid is a hydrocarbon solvent.

References Cited by the Examiner

UNITED STATES PATENTS

| | | |
|---|---|---|
| 2,645,291 | 7/1953 | Voorhees. |
| 2,667,224 | 1/1954 | Howard. |
| 2,818,118 | 12/1957 | Dixon. |
| 3,127,937 | 4/1964 | McGuire et al. _____ 166—42.1 |
| 3,155,159 | 11/1964 | McGuire et al. _____ 166—42.1 |

CHARLES E. O'CONNELL, *Primary Examiner.*

D. C. BLOCK, T. A. ZALENSKI, *Assistant Examiners.*